United States Patent
Zhang et al.

(10) Patent No.: US 10,133,006 B1
(45) Date of Patent: *Nov. 20, 2018

(54) SOFT CONTACTING ROTATIONAL INTERFACE SYSTEM FOR TRANSMITTING RF AND OPTICAL SIGNALS CONCURRENTLY ACROSS THEREOF

(71) Applicant: Princetel Inc., Hamilton, NJ (US)

(72) Inventors: Hong Zhang, Hamilton, NJ (US); Boying B. Zhang, Hamilton, NJ (US); Joe Ritacco, Hamilton, NJ (US); Jingrong Shen, Hamilton, NJ (US)

(73) Assignee: Princetel Inc., Hamilton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/697,830

(22) Filed: Sep. 7, 2017

(51) Int. Cl.
  *G02B 6/36* (2006.01)
  *H01R 24/54* (2011.01)
  *H01R 13/6581* (2011.01)
  *H01R 39/64* (2006.01)

(52) U.S. Cl.
  CPC ......... *G02B 6/3604* (2013.01); *H01R 24/542* (2013.01); *H01R 39/643* (2013.01); *H01R 13/6581* (2013.01)

(58) Field of Classification Search
  None
  See application file for complete search history.

(56) References Cited

U.S. PATENT DOCUMENTS

| | | | |
|---|---|---|---|
| 3,229,234 A | 1/1966 | Lattanzi | |
| 4,124,272 A | 11/1978 | Henderson et al. | |
| 4,373,779 A | 2/1983 | Dorsey | |
| 4,398,113 A | 8/1983 | Lewis et al. | |
| 5,039,193 A | 8/1991 | Snow et al. | |
| 5,140,289 A * | 8/1992 | Andrieu | G02B 6/3604 333/256 |
| 5,633,963 A | 5/1997 | Rickenbach et al. | |
| 5,949,929 A | 9/1999 | Hamm | |
| 8,410,988 B2 * | 4/2013 | Iverson | H01Q 3/02 333/135 |
| 8,786,385 B1 * | 7/2014 | Lorenc | H01P 1/062 333/256 |
| 8,837,876 B2 * | 9/2014 | Jones | G02B 6/3604 385/26 |
| 9,213,144 B2 * | 12/2015 | Jones | G02B 6/3604 |
| 9,634,449 B1 * | 4/2017 | Zhang | H01R 39/24 |
| 2005/0264377 A1 | 12/2005 | Faulkner et al. | |

* cited by examiner

*Primary Examiner* — Rhonda S Peace

(57) ABSTRACT

A system of soft contacting rotational interfaces with long service life, maintenance free, and high reliability, comprises a RF rotary joint and a single channel fiber optic rotary coupler and more particularly, a system having a plurality of conductive fiber brush bundles, a fiber optical wire and a coaxial conductor for transferring RF and optical signal(s) concurrently between relatively rotatable objects.

17 Claims, 4 Drawing Sheets

SOFT CONTACTING ROTATIONAL INTERFACE SYSTEM FOR TRANSMITTING RF AND OPTICAL SIGNALS CONCURRENTLY ACROSS THEREOF

FIELD OF THE EMBODIMENTS

The present invention relates generally to RF rotary joints, or microwave rotary joints, single channel fiber optic rotary coupler, and more particularly to a system having a plurality of conductive fiber brush bundles, a fiber optical wire and a coaxial conductor to transfer RF and optical signal(s) concurrently between relatively rotatable objects.

BACKGROUND OF THE EMBODIMENTS

RF rotary joints are electromechanical devices that consist of rotational (rotors) and stationary (stators) members. They allow the transmission of RF\ microwave signals and power from their rotors to stators or vise verse, and are used to change the direction of microwave propagation between two guides by rotating one with respect to other.

A conventional RF rotary joints consists of either a contacting or non-contacting interface to transfer RF\ microwave signals and power. In non-contacting rotating interfaces, electrical continuity for RF is typically achieved by using $\lambda/4$ chokes, to correspond to the quarter wavelength of a particular frequency which eliminate the need for physical contact at the rotating junction. The advantage of a non-contacting interface is that all physical wear is eliminated. Disadvantages of this approach are size and weight, particularly at lower frequencies, which have longer wavelengths and therefore require longer chokes.

In contacting rotating interfaces, two relative rotatable conductive parts keep sliding contact by spring, or other actuators. The advantage of a contacting rotating interfaces is that size can be greatly reduced when compared to a ¼ wavelength choke interface. Disadvantages of contacting rotating interfaces are increased torque, the need for a tight and perfectly concentric fit of the rotating interface, and the fact that contact stress in rotation causes wear and the wear debris would cause electrical failure at the rotating interface.

Examples of related art are described in U.S. Pat. No. 3,229,234 A, which pertains to a tinuity between a fixed and coaxial line operating in the dominant TEM mode and circular waveguide operating in the TM01 mode that enables extremely broad band coverage. The method of maintaining continuity is not dependent upon the impedance of the transmission lines selected; and U.S. Pat. App. No. 2005\0264377A1, which pertains to a rotary cable connector assembly for connecting coaxial waveguides. The assembly includes a metal stator having a counter bored well and a metal rotor extending coaxially into the well. An axial air gap is formed between the stator and rotor which each contain a conventional dielectric sleeve and center element for mating conventionally to carry a signal there between. An electrical connector/dynamic RF shield for providing an electrical path across the rotary joint and for shielding the air gap includes a pair of rings having crenelated cylindrical leaves extending axially toward each other and being interspersed. Each ring has a face for making electrical contact with the stator and rotor. A spring urges the rings into contact with the stator and rotor. The crenelated leaves provide RF shielding of the air gap surrounded by the shield. The rings are formed of bronze or other non-precious metal or alloy.

Fiber brush technology has been successfully used in electrical slip ring industry, where, a brush assembly comprising a multifilament conductive fiber brush contacts with a conductive slip ring surface. The brush assembly is constructed with thousands of hair-fine silver alloy fibers running on their tips, offer significant improvement over carbon brushes in both data and current transfer, offering extended brush and slip ring service life, high current capacity, and significant decreases in service acoustic and electrical noise.

Examples of related art are described in U.S. Pat. No. 4,398,113 A, which pertains to a slip ring and brush assembly comprises a gold plated slip ring surface and a bundle of conductive fibers in the 2 to 3 mil size range. During use, gold transfers from the ring to the fibers, and the resulting gold-on-gold contact interface of ring and brush is extremely noise free and long wearing.

The Fiber optic Rotary Coupler is the optic equivalent of the electrical slip ring. It allows uninterrupted transmission of an optic signal in a fiber guide through a rotational interface to a stationary apparatus. The Fiber optic Rotary Coupler is widely used in missile guidance systems, robotic systems, remotely operated vehicles, oil drilling systems, sensing systems, and many other field applications where a twist-free fiber cable is essential. Combined with electrical slip rings or fluid rotary couplers, Fiber optic Rotary Coupler adds a new dimension to traditional slip rings. As fiber optic technology advances, more and more traditional slip ring users will benefit from Fiber optic Rotary Coupler in their new fiber systems.

Comparing with its electrical counterpart, the electrical slip ring, the Fiber optic Rotary Coupler is not easy to fabricate because the transmission of the light beam through a fiber is strongly depend on its geometrical structure and related position. So it requires special design to ensure the transmission of light beam through a relative rotating coupler without suffering a large loss.

Examples of related art of single channel fiber optic rotary coupler are described in:

U.S. Pat. No. 5,039,193, which pertains to a rotary joint for singlemode optical fibers, having a fixed and a rotating part to permit the transmission of optical signals across a rotational interface (such as a winch or turret) with minimal insertion loss and, in particular, low reflections (good return loss). There is no need of conversion to electrical signals; the device is passive. It may be use an oil of refractive index matched to that of the glass fibers and to that of fiber tapers or lenses used to expand the beam emitted from one fiber and contract it for transmission into the other fiber. The device is bidirectional. By use foil, through precision techniques for building and mounting the optical and mechanical components, and by use of advanced bearings, both the insertion loss and unwanted reflections (return loss) can be minimized, thereby making it suitable for use with singlemode fiber. Insertion loss can be further reduced in conjunction with index-matching fluid by using optical elements (lenses, tapers, fibers) having angled or curved facets rather than perpendicular facets. Oil filling has the further advantage of pressure compensation allowing the device to operate at any ambient pressure. Lenses having curved surfaces can be accommodated by the use of fluid having a refractive index different from that of the lens material.

U.S. Pat. No. 4,124,272, which pertains to a rotary fiber optic waveguide coupling. Bared ends of two fiber optic waveguide cable sections are held in mutually-aligned end-to-end adjacent positions in opposite extension along a common rotary axis by a pair of ferrules having central through-openings in which such ends coextend and are bonded in close fit. The ferrules are held in precise axial position by abutment at their inner ends with annular shoulder in a pair of alignment caps mounted in two members movable relatively about such rotary axis. Retaining sleeves screwed into the relatively turnable members cooperate with washer members on the ferrules to obtain such abutment, and the ferrules project through openings in the alignment caps to obtain precise radial positioning. A friction-free rotary bearing interconnects the two relatively turnable members. The bearing is preloaded along the axis of rotation to give precise axial and radial positions of the one turnable member relative to the other.

U.S. Pat. No. 5,633,963, which pertains to a rotary joint for optical fibers comprising a plug assembly and a first ferrule having a fiber-entry end mounted coaxially therein, a receptacle assembly and a second ferrule having a fiber-entry end mounted coaxially therein, wherein at least one of the plug-mounted ferrule and the receptacle-mounted ferrule is biased outwardly from a fiber entry-end of the ferrule, and an alignment sleeve for optically connecting the first and second ferrules and maintaining the optical connection during rotation of one of the plug assembly and the receptacle assembly about an axis parallel to a longitudinal direction of the assembly relative to the other of the plug assembly and the receptacle assembly.

U.S. Pat. No. 5,949,929, which pertains to a connection that includes an interventional medical device having a rotatable optical fiber, an assembly having a conduit for conveying a light beam to the rotatable fiber as well as a rotor and a fixed housing, and a coupling. A drive mechanism is attached to the rotor for continuously rotating the rotor. The coupling includes a rotatable portion attachable to a proximal end of the rotatable fiber and to the rotor so as to permit the rotatable fiber to rotate continuously with the rotor while the rotatable fiber remains in axial alignment with the light beam. The coupling also includes a stationary shield surrounding the rotatable portion. The stationary shield is attachable to the fixed housing so as to urge the rotatable portion and the rotor together. The proximal end of the rotatable portion of the coupling has a vee-shaped coupling surface that complements a distal end surface of the rotor. The rotor is at least partially hollow and includes a bearing that holds the light beam conduit in axial alignment with the rotatable fiber when the rotatable portion of the coupling engages the rotor. The rotatable fiber may be disengageable from the rotatable portion of the coupling when the stationary shield does not engage the fixed housing. The rotatable fiber may be surrounded by a sheath that is attachable to the stationary portion of the coupling. A fluid port connected to the stationary portion of the coupling enables introduction of fluid into the sheath and around the rotatable optical fiber.

U.S. Pat. No. 4,373,779, which pertains to a single channel optical slip ring assembly comprising a hollow rotor shaft selectively dimensioned for receiving a fiber optic cable, a rotor bushing mounted in the rotor shaft and having an axial bore for receiving an optic fiber of a fiber optic cable, a stator cylindrical member selectively dimensioned for receiving a fiber optic cable, and having on one end an axially extending collar, a stator bushing mounted within the stator proximate the collar having an axial bore for receiving an optic fiber in each end thereof, means for rotatably mounting the bushing end of the rotor shaft within the collar of the stator cylindrical member so that the rotor bushing bore and the stator bushing bore are aligned along the axis of rotation and the bushings are separated by a selected gap, a gauging bore in the stator bushing which orthogonally intersects its axial bore, means in the stator cylindrical member for permitting access to the gauging bore, a stator fiber optic cable in the stator cylindrical member having an exposed length of optic fiber extending into the stator bushing bore to a selected gauged location within the gauging bore, and a rotor fiber optic cable in the rotor shaft having an exposed length of optic fiber passing through the rotor bushing bore, across the gap, and into the stator bushing bore to a selected gauged location spaced from the stator optic fiber within the gauging bore, whereby the rotor optic fiber rotates within the stator bushing and the fiber ends are maintained spaced from one another and in axial alignment thereby.

Most of the aforementioned references employ the expanded beam technology, i.e., using lenses to expand the light beam and collimate it before transmitting to a rotary coupler. The beam is then refocused and aligned with the receiving fiber. The lenses include graded index rod lens, aspheric lens, and GRIN lens. This method has several significant drawbacks. First, this kind of rotary coupler require special fixture to have lenses aligned. Secondly, using high quality lenses would increase the sizes and cost of fiber optic rotary couplers. Further, to maintain the axial alignment is difficult so that this kind of rotary coupler is vulnerable in such environments as temperature change, vibration and shock.

Above all, none of the reference art described above addresses all of the issues that the present invention does. There exist ample unmet needs for a system having a plurality of conductive fiber brush bundles, a fiber optical wire and a coaxial conductor to transfer RF and optical signal(s) concurrently between relatively rotatable objects.

SUMMARY OF THE EMBODIMENTS

In one embodiment of the present invention, there is provided a system of soft contacting rotational interfaces for transmitting RF and optical signals concurrently across a rotating interface, which comprises:

a stationary shield conductor assembly having a central bore on a first end and an inner open space co-axially on a second end;

a stationary core conductor assembly having a through hole for fiber mounting and an inner open space co-axially on a first end;

a ferrule having a through hole with tapered hole edges on a first end and a second end of said ferrule, and said ferrule being firmly mounted in said inner open space of said stationary core conductor with the axis of said through hole of said ferrule aligned to the axis of said through hole of said stationary core conductor;

a stationary insulating assembly with a central bore;

a rotational shield conductor assembly having a central bore with a tapered round head on a first end and an inner open space co-axially on a second end;

a rotational core conductor assembly with a tapered round head and a second end, which further comprising a through hole for fiber mounting, and said core conductor being rotatably mounted in said inner open space of said rotational shield conductor with the axis of said through hole of said rotational core conductor aligned to the axis of said through hole of said rotational shield conductor;

a rotational insulating assembly with a central bore;

a bearing assembly having a couple of bearings;

a first optic fiber with a tip, a tail and longitudinal axis, and said first optic fiber being firmly mounted in the said through hole of said stationary core conductor with the tip of said first optic fiber contacting the first end of said ferrule in the inner open space of said stationary core conductor with the axis of said through hole of said ferrule aligned to the center of the tip end of said first fiber, and the tail of said first optic fiber protruding out of a second end of said stationary core conductor;
a second optic fiber having a tip, a tail and longitudinal axis, and said second optic fiber being firmly mounted in the said through hole of said rotational core conductor with the tip of said second optic fiber recessing in the said through hole at the tapered round head end of said rotational core conductor and the tail of said second optic fiber protruding out of the second end of said rotational core conductor; and
all above-mentioned assemblies are coaxially disposed on a common axis, while all said rotational assemblies are rotatable relative to said stationary assemblies through said bearing assembly.

In one aspect of the present embodiment, said stationary insulating assembly is disposed in said central bore of said stationary shield conductor assembly, and said stationary core conductor assembly is disposed in said central bore of said stationary insulating assembly and separated from said stationary shield conductor assembly by said central bore of said stationary insulating assembly around said common axis.

In another aspect of the present embodiment, said rotational insulating assembly is disposed in said central bore of said rotational shield conductor assembly, and said rotational core conductor assembly is disposed in said central bore of said rotational insulating assembly and separated from said rotational shield conductor assembly by said central bore of said rotational insulating assembly around said common axis.

In still another aspect of the present embodiment, said stationary shield conductor assembly further comprises a first stationary RF receptacle (or connector) assembly being mounted sideway, a stationary shield conductor and a conductive fiber brush bundle; and said fiber brush bundle further contains a plurality of hair-thin conductive filaments to form a symmetrical flexible tube around said common axis; and said fiber brush bundle has two end portions, one of said end portion being coaxially and electrically fixed with said stationary shield conductor, while a contacting end of said first stationary RF connector assembly is electrically engage with an outside surface of an end portion of said stationary core conductor within said inner open space of said stationary shield conductor.

In yet another aspect of the present embodiment, there is provided the system which further comprises a second stationary RF receptacle (or connector) assembly being mounted sideway on said second end of said rotational shield conductor assembly, wherein a contacting end of said RF connector is frictionally having a constant physical and electrical contact with an outside surface of an end portion of said rotational core conductor within said inner open space of said rotational shield conductor.

In yet another aspect of the present embodiment, there is provided the system, wherein said stationary core conductor assembly further comprises a stationary core conductor and a conductive fiber brush bundle; and said fiber brush bundle further contains a plurality of hair-thin conductive filaments to form a symmetrical flexible tube around said common axis; and said fiber brush bundle has two end portion, one of said end portion is coaxially and electrically fixed with said stationary core conductor.

In yet another aspect of the present embodiment, there is provided the system, wherein one of said end portion of said fiber brush bundle in said stationary shield conductor assembly is sized to have a constant physical contact with said tapered round head in said rotational shield conductor assembly so as to form a shield soft contacting rotational interface around said tapered round head.

In yet another aspect of the present embodiment, there is provided the system, wherein one of said end portions of said fiber brush bundle in said stationary core conductor assembly is sized to have a constant physical contact with said tapered round head in said rotational core conductor assembly so as to form a core soft contacting rotational interface around said tapered round head.

In yet another aspect of the present embodiment, there is provided the system, wherein said core soft contacting rotational interface is totally isolated from said shield soft contacting rotational interface by said stationary insulating assembly and rotational insulating assembly.

In another embodiment of the present invention, there is provided a system of soft contacting rotational interfaces for transmitting RF and optical signals concurrently across a rotating interface, comprising:
a stationary shield conductor assembly with a central bore;
a stationary core conductor assembly;
a stationary insulating assembly with a central bore;
a rotational shield conductor assembly with a central bore and tapered round head;
a rotational core conductor assembly with a tapered round head;
a rotational insulating assembly with a central bore;
a bearing assembly having a couple of bearings; and
said assemblies are coaxially disposed on a common axis, and said rotational assemblies are rotatable relative to said stationary assemblies through said bearing assembly.

In one aspect of the present embodiment, there is provided the system, wherein said stationary insulating assembly is disposed in said central bore of said stationary shield conductor assembly, and said stationary core conductor assembly is disposed in said central bore of said stationary insulating assembly and separated from said stationary shield conductor assembly by said central bore of said stationary insulating assembly around said common axis.

In another aspect of the present embodiment, there is provided the system, wherein said rotational insulating assembly is disposed in said central bore of said rotational shield conductor assembly, and said rotational core conductor assembly is disposed in said central bore of said rotational insulating assembly and separated from said rotational shield conductor assembly by said central bore of said rotational insulating assembly around said common axis.

In still another aspect of the present embodiment, there is provided the system, wherein said stationary shield conductor assembly further comprises a stationary RF receptacle (or connector), a stationary shield conductor and a braided conductive tube assembly; and said braided conductive tube assembly has two end portions and one middle portion, one of said end portions being coaxially and electrically fixed with said stationary shield conductor.

In yet another aspect of the present embodiment, there is provided the system, wherein said stationary core conductor assembly further comprises a stationary core conductor and a braided conductive tube assembly; and said braided conductive tube assembly has two end portions and one middle portion, and one of said end portions being coaxially and electrically fixed with said stationary core conductor.

In yet another aspect of the present embodiment, there is provided the system, wherein said middle portion of said braided conductive tube assembly in said stationary shield conductor assembly is sized to have a constant physical contact with said tapered round head in said rotational shield conductor assembly so as to form a shield soft contacting rotational interface around said tapered round head.

In yet another aspect of the present embodiment, there is provided the system, wherein said middle portion of said braided conductive tube assembly in said stationary core conductor assembly is sized to have a constant physical contact with said tapered round head in said rotational core conductor assembly so as to form a core soft contacting rotational interface around said tapered round head.

In still yet another aspect of the present embodiment, there is provided the system, wherein said core soft contacting rotational interface is totally isolated from said shield soft contacting rotational interface by said stationary insulating assembly and rotational insulating assembly.

It is an object for the present invention to create a system of soft contacting rotational interfaces with long service life, maintenance free, and high reliability by using a plurality of conductive fiber brush bundles, a fiber optical wire and a coaxial line for transmitting RF and optical signals concurrently across relatively rotatable objects.

It is another object of the present invention to provide a single channel fiber optic rotary coupler with a very low-profile and compact design, which minimizes the need for maintaining precise axial alignment between the rotating and non-rotating elements of a single channel fiber optic rotary coupler so that it could be used in any harsh environments such as temperature change, vibration and shock.

It is further another objective of the preset invention to reduce the insertion loss and increase return loss and to allow the rotary coupler to work at any ambient pressure by filling index-matching fluid.

DESCRIPTION OF THE PREFERRED EMBODIMENTS

Figure 1:
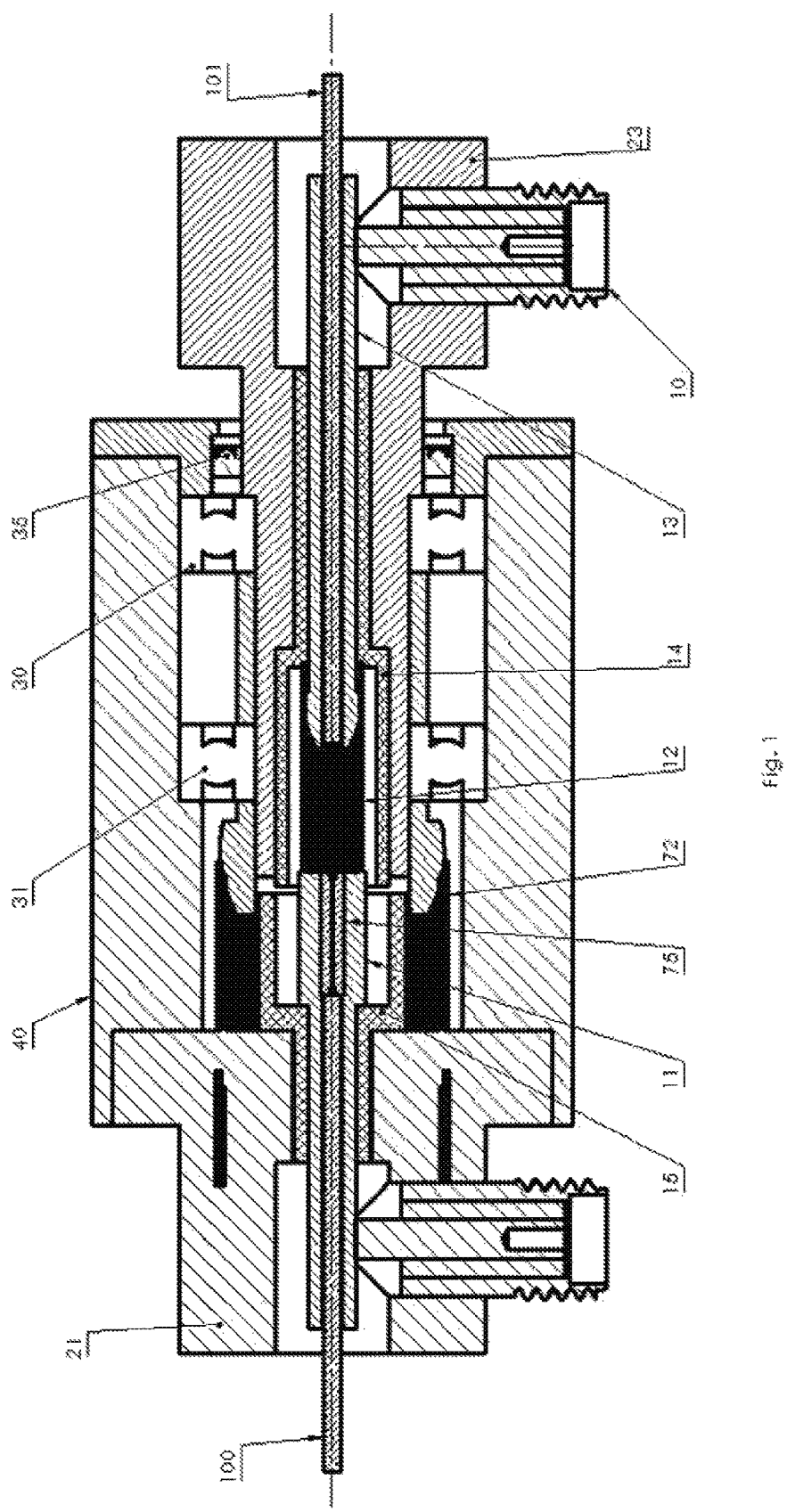
FIG. 1 shows a longitudinal cross sectional view of an embodiment of the present invention of a rotational interface system.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIG. 1, which shows a longitudinal cross sectional view of a system of soft contacting rotational interfaces with a single channel coaxial line RF rotary joint, as well as a single channel fiber optic rotary coupler with a very low-profile and compact design, for transmitting RF and optical signals concurrently across the rotational interfaces. The RF rotary joint/fiber optic rotary coupler consists mainly of a coaxial line with the soft contacting rotational interfaces, the stationary member and rotational member assemblies, both of which contain a through hole for fiber mounting and also maintain electrical contact, either permanently or frictionally, with central poles of two RF receptacles (or connectors).

Figure 2:
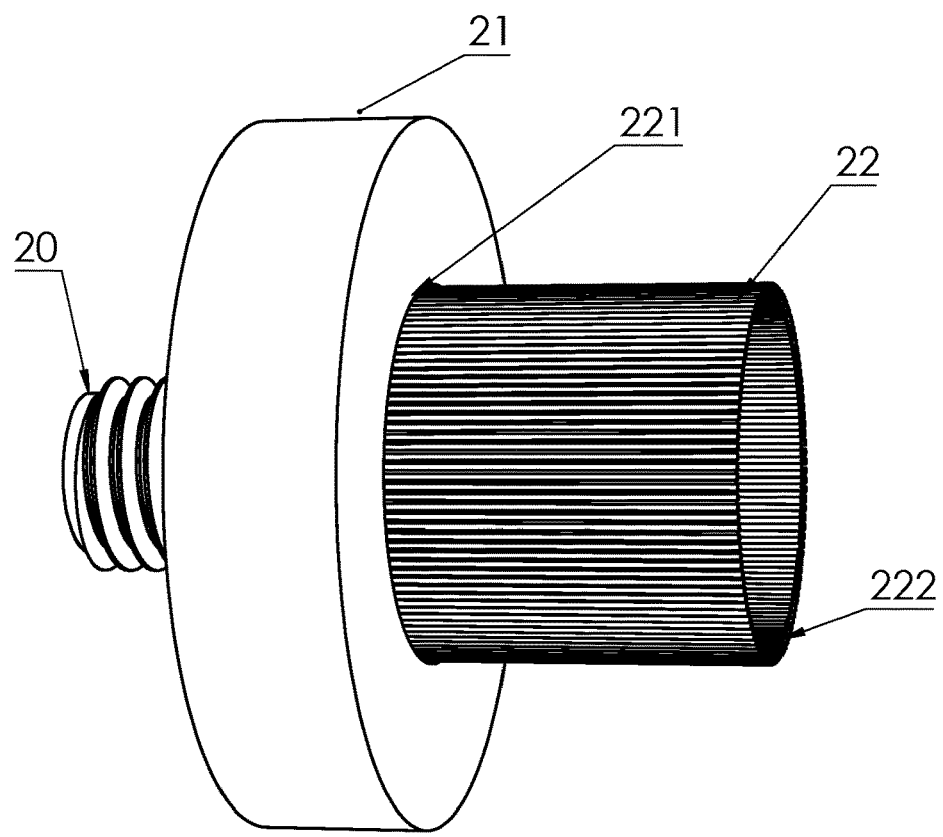
FIG. 2 shows a perspective view of an embodiment of the invention of a stationary shield conductor assembly.

In FIG. 1, the numbered parts, where like reference numerals designate identical or corresponding parts, are as the following:

10 —SMA RF receptacle (or connector) on the rotational side
11 —central conductor on the stationary side;
12 —fiber brush bundle, stationary central conductor;
13 —central conductor on the rotational side;
14 —rotational insulating spacer;
15 —stationary insulating spacer;
20 —RF receptacle (or connector) on the stationary side
21 —stationary conductor with shielding;
22 —fiber brush bundle, stationary shield conductor;
23 —rotational conductor with shielding;
24 –bearing spacer;
26 —rotational shield conductor;
30 —bearing;
31 —bearing;
35 —seal;
40 —housing;
41 —end cap;
71 —core soft contacting rotational interface;
72 —fiber brush bundle shielding for soft contacting rotational interface;
75 —ferrule;
80 —rotation axis of the RF/optical fiber rotary joint and the common geometric axis of all listed parts;

Referring now to FIG. 2 is the detailed view of stationary shield conductor assembly. It consists of the stationary RF receptacle (or connector) 20, stationary shield conductor 21 and the conductive fiber brush bundle 22. Said fiber brush bundle 22 contains a plurality of hair-thin silver alloy filaments to form a symmetrical "hair tube" relative to axis 80. Said fiber brush bundle 22 has two end portion, 221 and 222. Said end portion 221 is coaxially and electrically fixed with stationary shield conductor 21.

Figure 3:
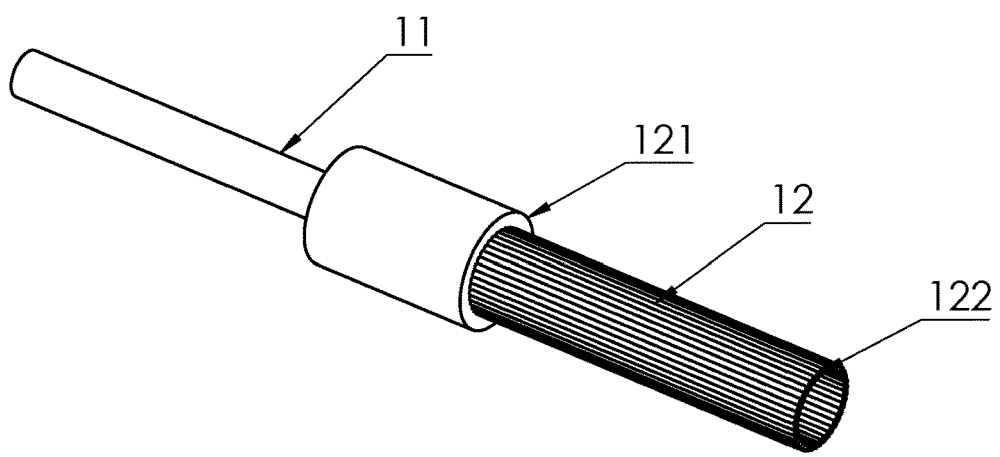
FIG. 3 shows a perspective view of an embodiment of the invention of a stationary core conductor assembly.

Referring now to FIG. 3 is the detailed view of stationary core conductor assembly. It consists of the stationary core conductor 11 and the fiber brush bundle 12. Said fiber brush bundle 12 contains a plurality of hair-thin silver alloy filaments to form a symmetrical "hair tube" relative to axis 80. Said fiber brush bundle 12 has two end portion, 121 and 122. Said end portion 121 is coaxially and electrically fixed with stationary core conductor 11.

Figure 4:
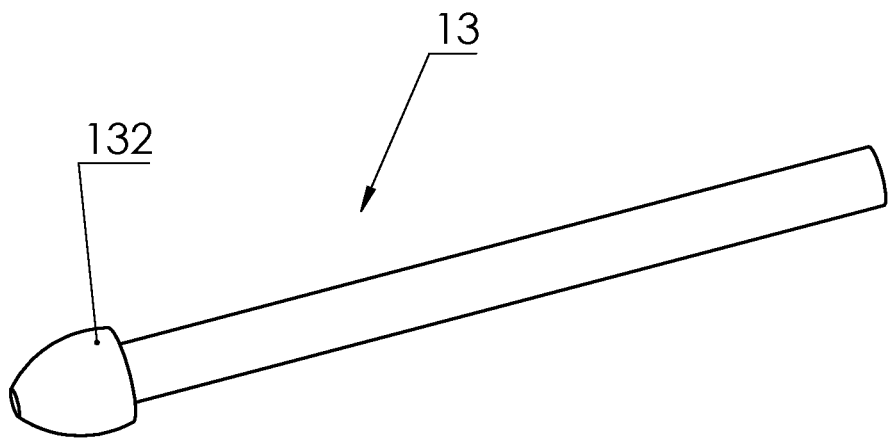
FIG. 4 shows a perspective view of an embodiment of the invention of the configuration of the rotational core conductor of the coaxial line.

Referring now to FIG. 4 shows the configuration of the central conductor on the rotational side 13 in the present invention, which contains an outside coaxial shell for transmitting RF signals and internal through hole for mounting a fiber optical for transmitting digital signals. The rotational core conductor 13 have a coaxial tapered round head 132.

Figure 5:
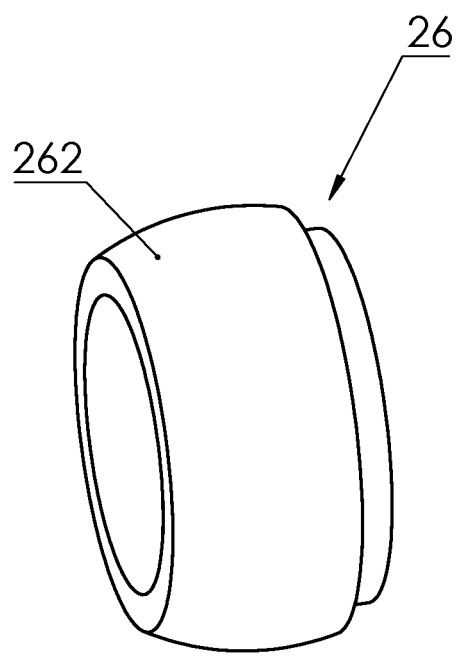
FIG. 5 shows a perspective view of an embodiment of the invention of the configuration of the rotational shield conductor of the coaxial line in the present invention.

Referring now to FIG. 5 shows the configuration of the rotational shield conductor 26 of the coaxial line in the present invention. The rotational shield conductor 26 have a coaxial tapered round head 262.

Referring now back to FIG. 1, said stationary core conductor assembly in FIG. 2 is coaxially fixed in the center bore of stationary shield conductor assembly and separated from stationary shield conductor 21 by stationary insulating spacer 15. The rotational shield conductor assembly includes conductors with shielding on the rotational side 23 and 26. They are supported by two ball bearings 30 and 31 and rotatable relative to housing 40. Said rotational shield conductor 26 is fixed at the internal end portion of the rotational shield conductor 23. The rotational core conductor 13 in FIG. 5 is coaxially fixed in the center bore of said rotational shield conductor assembly and separated from rotational shield conductor 23 by rotational insulating spacer 14. The end portion 122 of the fiber brush bundle 12 is sized to have a constant physical contact with said tapered round head 132 of the rotational core conductor 13 during the rotation between the RF receptacle (or connector) on the rotational side 10 and its counterpart on the stationary side 20, so as to form the core soft contacting rotational interface 71 around the tapered round head 132 of the rotational core conductor 13. Similarly, the end portion 222 of the fiber brush bundle 22 is sized to have a constant physical contact with said tapered round head 262 of the rotational shield conductor 26 during the rotation between the RF receptacle (or connector) on the rotational side 10 and RF receptacle (or connector) on the stationary side 20, so as to form the shield soft contacting rotational interface 72 around the tapered round head 262 of the rotational shield conductor 26. The stationary insulating spacer 15 and rotational insulating spacer 14 have an overlap so that the core conductors are completely separated from shield conductors by dialectical material. The rotational side is sealed by end cap 41 and shaft seal 35. The RF receptacle (or connector) on the rotational side 10 is mounted on the rotational conductor with shielding 23 perpendicular to the central conductor on the rotational side 13 along the rotation axis of the RF/optical fiber rotary joint, and the common geometric axis of the system while the central conductor of the RF receptacle 10 maintains a constant frictional and electrical contact with the central conductor on the rotational side 13. Similarly, the RF receptacle (or connector) on the stationary side 20 is mounted on the stationary conductor with shielding 23 perpendicular to the central conductor on the central conductor on the stationary side 11 along the common geometric axis of the system of the RF/optical fiber rotary joint, while the central conductor of the RF receptacle 20 maintains a constant electrical contact with the central conductor on the stationary side 11.

Further referring to FIG. 1, both said central conductor on the stationary side 11 and said central conductor on the rotational side 13 have internal through holes for mounting optical fibers for transmitting digital signals. The fiber on the stationary side extends adjacent to a ferrule 75, which contains a through hole with tapered hole edges on both of its ends to allow transmission of digital signals, and said ferrule is firmly mounted in an inner open space of the central conductor on the stationary side 11 with the axis of said through hole of said ferrule aligned to the common geometric axis of the system of the RF/optical fiber rotary joint.

Figure 6A:
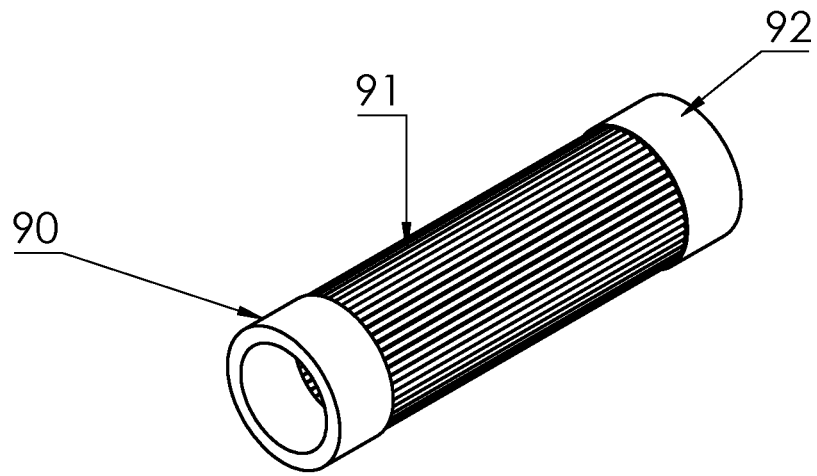
FIG. 6a shows a perspective view of an embodiment of the invention of a braided conductive tube assembly before deformation in the present invention.
Figure 6B:
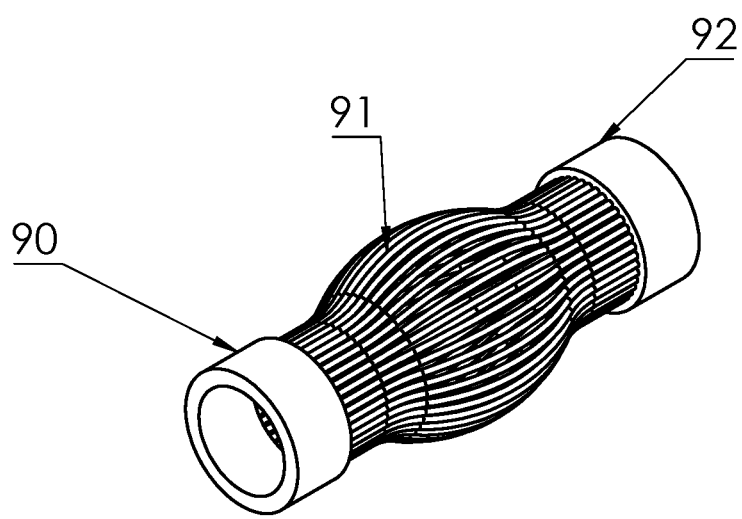
FIG. 6b shows a perspective view of an embodiment of the invention of a braided conductive tube assembly after deformation in the present invention.

An alternative way to form soft contacting rotational interfaces is to use braided conductive tube assembly instead of conductive fiber brush bundles. The braided conductive tube is commercially available. They are flexible. FIG. 6a shows a braided conductive tube assembly in the present invention, which includes conductive ring 90, 92, and braided conductive tube 91. They are disposed concentrically. FIG. 6b is a braided conductive tube assembly after deformation by mating with the tapered round head of either core, or shield conductors in the present invention.

The many elements of the present invention make it unique in the field. The novelty is illustrated by the various options for nearly every aspect of the invention that allow it to be used in the proper exercise form by a variety of users, both in terms of body size and fitness level. Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A system of soft contacting rotational interfaces for transmitting RF and optical signals concurrently across a rotating interface comprising:

a stationary shield conductor assembly having a central bore on a first end and an inner open space co-axially on a second end;

a stationary core conductor assembly having a through hole for fiber mounting and an inner open space co-axially on a first end;

a ferrule having a through hole with tapered hole edges on a first end and a second end of said ferrule, and said ferrule being firmly mounted in said inner open space of said stationary core conductor with the axis of said through hole of said ferrule aligned to the axis of said through hole of said stationary core conductor;

a stationary insulating assembly with a central bore;

a rotational shield conductor assembly having a central bore with a tapered round head on a first end and an inner open space co-axially on a second end;

a rotational core conductor assembly with a tapered round head and a second end, which further comprising a through hole for fiber mounting, and said core conductor being rotatably mounted in said inner open space of said rotational shield conductor with the axis of said through hole of said rotational core conductor aligned to the axis of said through hole of said rotational shield conductor;

a rotational insulating assembly with a central bore;

a bearing assembly having a couple of bearings;

a first optic fiber with a tip, a tail and longitudinal axis, and said first optic fiber being firmly mounted in the said through hole of said stationary core conductor with the tip of said first optic fiber contacting the first end of said ferrule in the inner open space of said stationary core conductor with the axis of said through hole of said ferrule aligned to the center of the tip end of said first fiber, and the tail of said first optic fiber protruding out of a second end of said stationary core conductor; and a second optic fiber having a tip, a tail and longitudinal axis, and said second optic fiber being firmly mounted in the said through hole of said rotational core conductor with the tip of said second optic fiber recessing in the said through hole at the tapered round head end of said rotational core conductor and the tail of said second optic fiber protruding out of the second end of said rotational core conductor;

wherein all said assemblies are coaxially disposed on a common axis, and all said rotational assemblies are rotatable relative to said stationary assemblies through said bearing assembly.

2. The system according to claim 1, wherein said stationary insulating assembly is disposed in said central bore of said stationary shield conductor assembly, and said stationary core conductor assembly is disposed in said central bore of said stationary insulating assembly and separated from said stationary shield conductor assembly by said central bore of said stationary insulating assembly around said common axis.

3. The system according to claim 1, wherein said rotational insulating assembly is disposed in said central bore of said rotational shield conductor assembly, and said rotational core conductor assembly is disposed in said central bore of said rotational insulating assembly and separated from said rotational shield conductor assembly by said central bore of said rotational insulating assembly around said common axis.

4. The system according to claim 1, wherein said stationary shield conductor assembly further comprises a first stationary RF receptacle (or connector) assembly being mounted sideway, a stationary shield conductor and a conductive fiber brush bundle; and said fiber brush bundle further contains a plurality of hair-thin conductive filaments to form a symmetrical flexible tube around said common axis; and said fiber brush bundle has two end portions, one of said end portion being coaxially and electrically fixed with said stationary shield conductor; and a contacting end of said first stationary RF connector assembly is electrically engage with an outside surface of an end portion of said stationary core conductor within said inner open space of said stationary shield conductor.

5. The system according to claim 1, further comprising a second stationary RF receptacle (or connector) assembly being mounted sideway on said second end of said rotational shield conductor assembly, wherein a contacting end of said RF connector is frictionally having a constant physical and electrical contact with an outside surface of an end portion of said rotational core conductor within said inner open space of said rotational shield conductor.

6. The system according to claim 1, wherein said stationary core conductor assembly further comprises a stationary core conductor and a conductive fiber brush bundle; and said fiber brush bundle further contains a plurality of hair-thin conductive filaments to form a symmetrical flexible tube around said common axis; and said fiber brush bundle has two end portions, one of said end portion being coaxially and electrically fixed with said stationary core conductor.

7. The system according to either claim 1 or claim 4, wherein one of said end portions of said fiber brush bundle in said stationary shield conductor assembly is sized to have a constant physical contact with said tapered round head in said rotational shield conductor assembly so as to form a shield soft contacting rotational interface around said tapered round head.

8. The system according to either claim 1 or claim 6, wherein one of said end portions of said fiber brush bundle in said stationary core conductor assembly is sized to have a constant physical contact with said tapered round head in said rotational core conductor assembly so as to form a core soft contacting rotational interface around said tapered round head.

9. The system according to any one of claim 1, 7 or 8, wherein said core soft contacting rotational interface is totally isolated from said shield soft contacting rotational interface by said stationary insulating assembly and rotational insulating assembly.

10. A system of soft contacting rotational interfaces for transmitting RF and optical signals concurrently across a rotating interface comprising:
a stationary shield conductor assembly with a central bore;
a stationary core conductor assembly;
a stationary insulating assembly with a central bore;
a rotational shield conductor assembly with a central bore and tapered round head;
a rotational core conductor assembly with a tapered round head;
a rotational insulating assembly with a central bore; and
a bearing assembly having a couple of bearings;
wherein said assemblies are coaxially disposed on a common axis, and said rotational assemblies are rotatable relative to said stationary assemblies through said bearing assembly.

11. The system according to claim 10, wherein said stationary insulating assembly is disposed in said central bore of said stationary shield conductor assembly, and said stationary core conductor assembly is disposed in said central bore of said stationary insulating assembly and separated from said stationary shield conductor assembly by said central bore of said stationary insulating assembly around said common axis.

12. The system according to claim 10, wherein said rotational insulating assembly is disposed in said central bore of said rotational shield conductor assembly, and said rotational core conductor assembly is disposed in said central bore of said rotational insulating assembly and separated from said rotational shield conductor assembly by said central bore of said rotational insulating assembly around said common axis.

13. The system according to claim 10, wherein said stationary shield conductor assembly further comprises a stationary RF receptacle (or connector), a stationary shield conductor and a braided conductive tube assembly; and said braided conductive tube assembly has two end portions and one middle portion; one of said end portions being coaxially and electrically fixed with said stationary shield conductor.

14. The system according to claim 10, wherein said stationary core conductor assembly further comprises a stationary core conductor and a braided conductive tube assembly; and said braided conductive tube assembly has two end portions and one middle portion; one of said end portions being coaxially and electrically fixed with said stationary core conductor.

15. The system according to either claim 10 or claim 13, wherein said middle portion of said braided conductive tube assembly in said stationary shield conductor assembly is sized to have a constant physical contact with said tapered round head in said rotational shield conductor assembly so as to form a shield soft contacting rotational interface around said tapered round head.

16. The system according to either claim 10 or claim 14, wherein said middle portion of said braided conductive tube assembly in said stationary core conductor assembly is sized to have a constant physical contact with said tapered round head in said rotational core conductor assembly so as to form a core soft contacting rotational interface around said tapered round head.

17. The system according to any one of claim 10, 15 or 16, wherein said core soft contacting rotational interface is totally isolated from said shield soft contacting rotational interface by said stationary insulating assembly and rotational insulating assembly.

* * * * *